(12) United States Patent
Thomasson et al.

(10) Patent No.: US 8,745,799 B1
(45) Date of Patent: Jun. 10, 2014

(54) FALL PROTECTION CAGE WITH ADJUSTABLE OUTBOARD UPRIGHT

(71) Applicant: Aluminium Ladder Company, Florence, SC (US)

(72) Inventors: Allyn Thomasson, Darlington, SC (US); Sandy W. Tyner, Hartsville, SC (US); Ellie H. MacDonald, Timmonsville, SC (US); Ronald W. Bennett, Florence, SC (US)

(73) Assignee: Sam Carbis Asset Management, LLC, Florence, SC (US)

( * ) Notice: Subject to any disclaimer, the term of this patent is extended or adjusted under 35 U.S.C. 154(b) by 0 days.

(21) Appl. No.: 13/777,371

(22) Filed: Feb. 26, 2013

Related U.S. Application Data

(60) Provisional application No. 61/751,586, filed on Jan. 11, 2013.

(51) Int. Cl.
*E01D 19/10* (2006.01)
*B65G 69/26* (2006.01)
*E01F 1/00* (2006.01)

(52) U.S. Cl.
CPC .. *B65G 69/26* (2013.01); *E01F 1/00* (2013.01)
USPC .................................................. 14/71.3; 14/31

(58) Field of Classification Search
CPC .................................. B65G 69/26; E01F 1/00
USPC .......... 14/31, 69.5–71.3, 71.7, 72.5; 182/113, 182/141
See application file for complete search history.

(56) References Cited

U.S. PATENT DOCUMENTS

| | | | |
|---|---|---|---|
| 4,133,067 A * | 1/1979 | Bennett et al. | 14/71.3 |
| 4,679,657 A | 7/1987 | Bennett et al. | |
| 5,042,612 A | 8/1991 | Bennett et al. | |
| 5,392,878 A | 2/1995 | Bennett et al. | |
| 6,691,613 B1 | 2/2004 | Francille | |
| 7,140,467 B2 | 11/2006 | Cook | |
| 7,216,741 B2 * | 5/2007 | MacDonald et al. | 182/113 |
| 8,015,647 B2 | 9/2011 | Bennett | |
| 8,403,109 B2 | 3/2013 | Bennett | |
| 8,632,099 B2 * | 1/2014 | Conny et al. | 280/837 |
| 2009/0144916 A1 | 6/2009 | Honeycutt et al. | |
| 2011/0047724 A1 | 3/2011 | Honeycutt | |
| 2011/0078864 A1 | 4/2011 | Bennett | |
| 2011/0225794 A1 | 9/2011 | Honeycutt et al. | |
| 2012/0017383 A1 | 1/2012 | Honeycutt | |
| 2012/0045274 A1 | 2/2012 | Mizell et al. | |
| 2012/0073902 A1 | 3/2012 | Honeycutt | |
| 2013/0015016 A1 | 1/2013 | Honeycutt | |
| 2013/0256058 A1 * | 10/2013 | Borghi | 182/113 |

* cited by examiner

*Primary Examiner* — Raymond W Addie

(74) *Attorney, Agent, or Firm* — Dority & Manning, P.A.

(57) ABSTRACT

An apparatus that provides selectively deployable worker access with fall protection to at least a portion of the top of a container has a gangway that is configured to be retrofitted to an elevated platform from which the gangway and a fall protection cage is selectively deployable over the top of the container. The fall protection cage is connected to the gangway via a fixed stanchion and an abutment that is adjustably disposed outboard of the fixed stanchion and connected thereto via at least one selectively length adjustable screw member.

21 Claims, 9 Drawing Sheets

FALL PROTECTION CAGE WITH ADJUSTABLE OUTBOARD UPRIGHT

CROSS-REFERENCE TO RELATED APPLICATIONS

The present application claims priority to currently pending U.S. Provisional Patent Application Ser. No. 61/751,586, filed Jan. 11, 2013, which is hereby incorporated herein in its entirety for all purposes.

STATEMENT REGARDING FEDERALLY SPONSORED RESEARCH OR DEVELOPMENT

Not applicable.

FIELD OF THE INVENTION

The subject matter disclosed herein generally involves fall protection equipment for accessing the tops of rolling stock, and particularly extendable equipment that hangs from one end of an elevated loading platform.

BACKGROUND OF THE INVENTION

In accessing the tops of rolling stock (tank trucks, tank railroad cars, etc.), a gangway or bridge is used to allow workers to move cargo from an elevated loading platform to the top of the rolling stock. These gangways include cantilevers that usually carry a protective enclosure (aka cage) added to the outboard end to provide fall protection while the worker is on top of the rolling stock. In one type of these gangways such as disclosed in U.S. Pat. Nos. 5,042,612; 5,392,878 and 7,140,467, one end of each of the respective cantilevers can be carried on a respective stanchion that extends vertically from one respective end of the loading platform. The cantilever rides up and down along the stanchion like an elevator car between a relatively elevated stowed orientation with respect to the top of rolling stock and a relatively lowered operative orientation with respect to the top of rolling stock.

In another type of these gangways such as disclosed in U.S. Pat. Nos. 4,679,657; 7,216,741 and 8,015,647, one end of each of the respective cantilevers is pivotally connected to one respective end of the loading platform and can be moved pivotally like a drawbridge between a relatively elevated stowed orientation respect to the top of rolling stock and a relatively lowered operative orientation with respect to the top of rolling stock.

However, when the gangway is raised to the stored position, it is important that the bottom of the enclosure has clearance above the rolling stock so that the enclosure avoids contact with the rolling stock and the equipment used to move the rolling stock. In the case of railroads for example, there can be clearance envelopes that must be maintained.

There are many instances in which the clearance height at the outboard side of the enclosure can become inadequate to avoid coming into contact with the rolling stock or the equipment used to move the rolling stock. Such instances can arise when the outboard side of the enclosure leans or that deflects due to the size and/or weight of the enclosure. Such instances can arise from a loading rack that isn't level or from fabrication tolerances.

In the past, this leaning of the outboard side of the enclosure was compensated by anticipating the deflection and designing for it or by the use of shims. However, because both the size and the weight of the enclosures has increased greatly to provide an increased level of fall protection, designs that compensate for the anticipated leaning of these much larger and heavier enclosures are very costly and/or otherwise impractical.

BRIEF DESCRIPTION OF THE DRAWINGS

Aspects and advantages of the invention are set forth below in the following description, or may be obvious from the description, or may be learned through practice of embodiments of the invention. Those of ordinary skill in the art will better appreciate the features and aspects of such embodiments, and others, upon review of the specification. A full and enabling disclosure of the present invention, including the best mode thereof to one skilled in the art, is set forth more particularly in this specification, including reference to the accompanying figures, in which.

Figure 1:
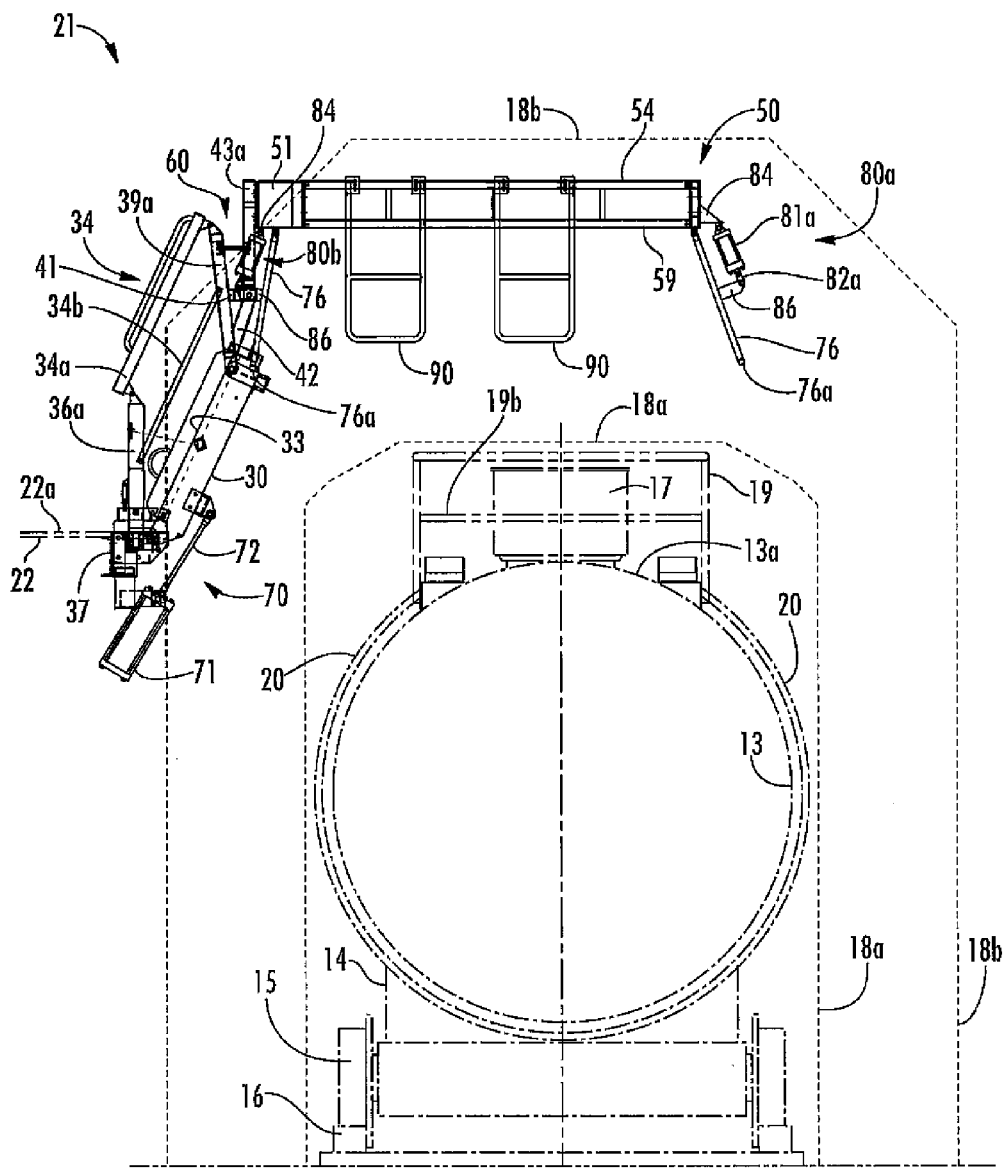
FIG. 1 is a front plan view taken in FIG. 3 along the sight lines of the arrows designated 1-1 of an embodiment of a selectively deployable fall protection enclosure disposed in the stored orientation above a railroad tank car shown in dashed outline.

The accompanying drawings, which are incorporated in and constitute a part of this specification, illustrate at least one presently preferred embodiment of the invention as well as some alternative embodiments. These drawings, together with the written description, serve to explain the principles of the invention but by no means are intended to be exhaustive of all of the possible manifestations of the invention.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

It is to be understood that the ranges and limits mentioned herein include all sub-ranges located within the prescribed limits, inclusive of the limits themselves unless otherwise stated. For instance, a range from 100 to 200 also includes all possible sub-ranges, examples of which are from 100 to 150, 170 to 190, 153 to 162, 145.3 to 149.6, and 187 to 200. Further, a limit of up to 7 also includes a limit of up to 5, up to 3, and up to 4.5, as well as all sub-ranges within the limit, such as from about 0 to 5, which includes 0 and includes 5 and from 5.2 to 7, which includes 5.2 and includes 7.

Figure 2:
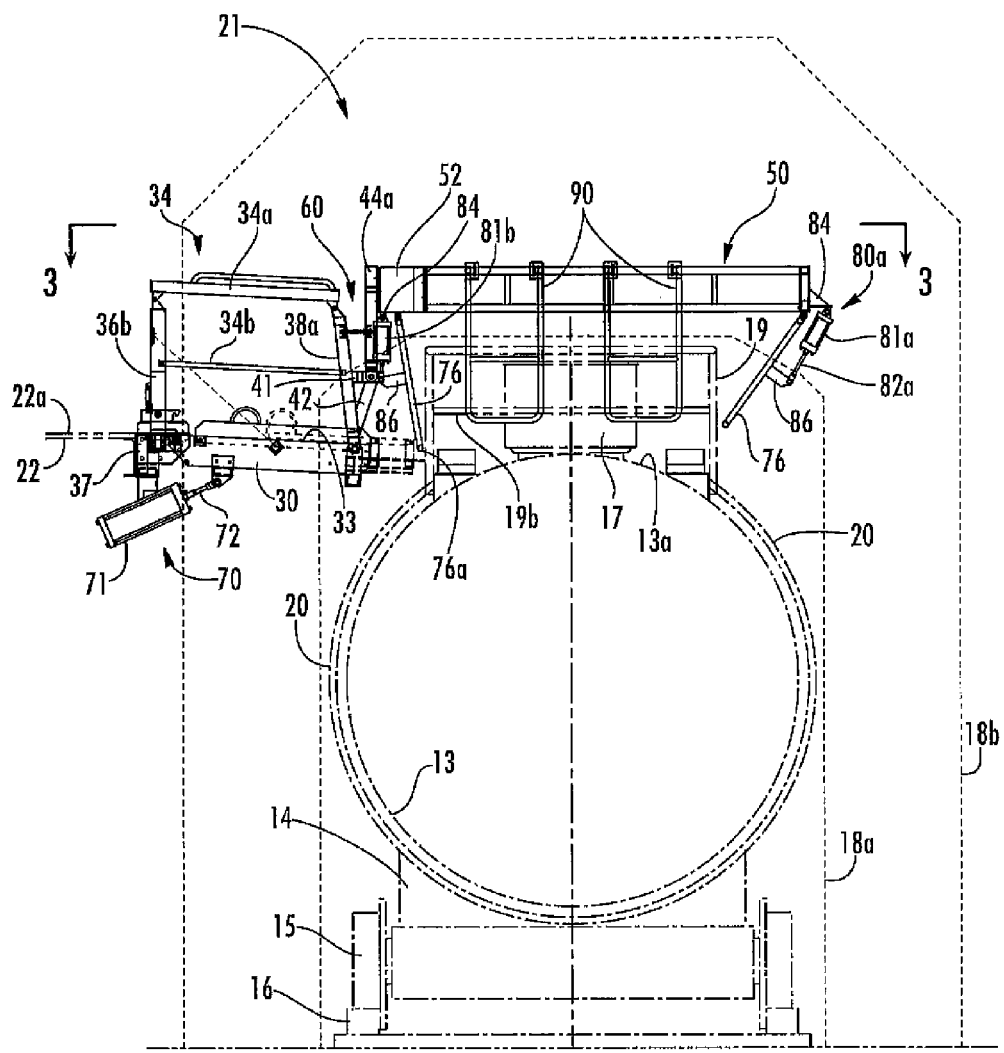
FIG. 2 is a front plan view taken in FIG. 3 along the sight lines of the arrows designated 2-2 of an embodiment of a selectively deployable fall protection enclosure disposed in the working orientation above a railroad tank car shown in dashed outline.

As depicted in each of FIGS. 1 and 2, the outline of a cylindrical tank 13 for storage and transport of bulk materials, typically but not necessarily in gaseous or liquid form, is schematically indicated as being mobile due to its carriage on the bed of a railcar 14 that has wheels 15 traveling on railway tracks 16 that extend beneath the loading area, which can be covered. The tank 13 is a container that can be filled with or emptied of the bulk material via one or more covered hatches 17 rising above the top 13a of the main body of the container. To perform various loading and unloading operations with respect to the contents of the tank 13, workers must have access to the top 13a of the tank 13, the top 13a of which typically is elevated a considerable distance above the ground in relation to the height of the ordinary worker.

In each of FIGS. 1 and 2, the dashed line designated 18a schematically indicates the outline of the overhead clearance requirements for railroad cars 14 standing on loading tracks 16 or side tracks 16 in an industrial loading area for example. Such overhead clearance requirements pertain to about 95% of the loading zones where embodiments of the present invention would be installed. In each of FIGS. 1 and 2, the dashed line designated 18b schematically indicates the outline of overhead clearance requirements for railroad cars on rolling tracks 16. Embodiments of the present invention also could be adapted to loading stations subject to these more stringent overhead clearance requirements.

Figure 3:
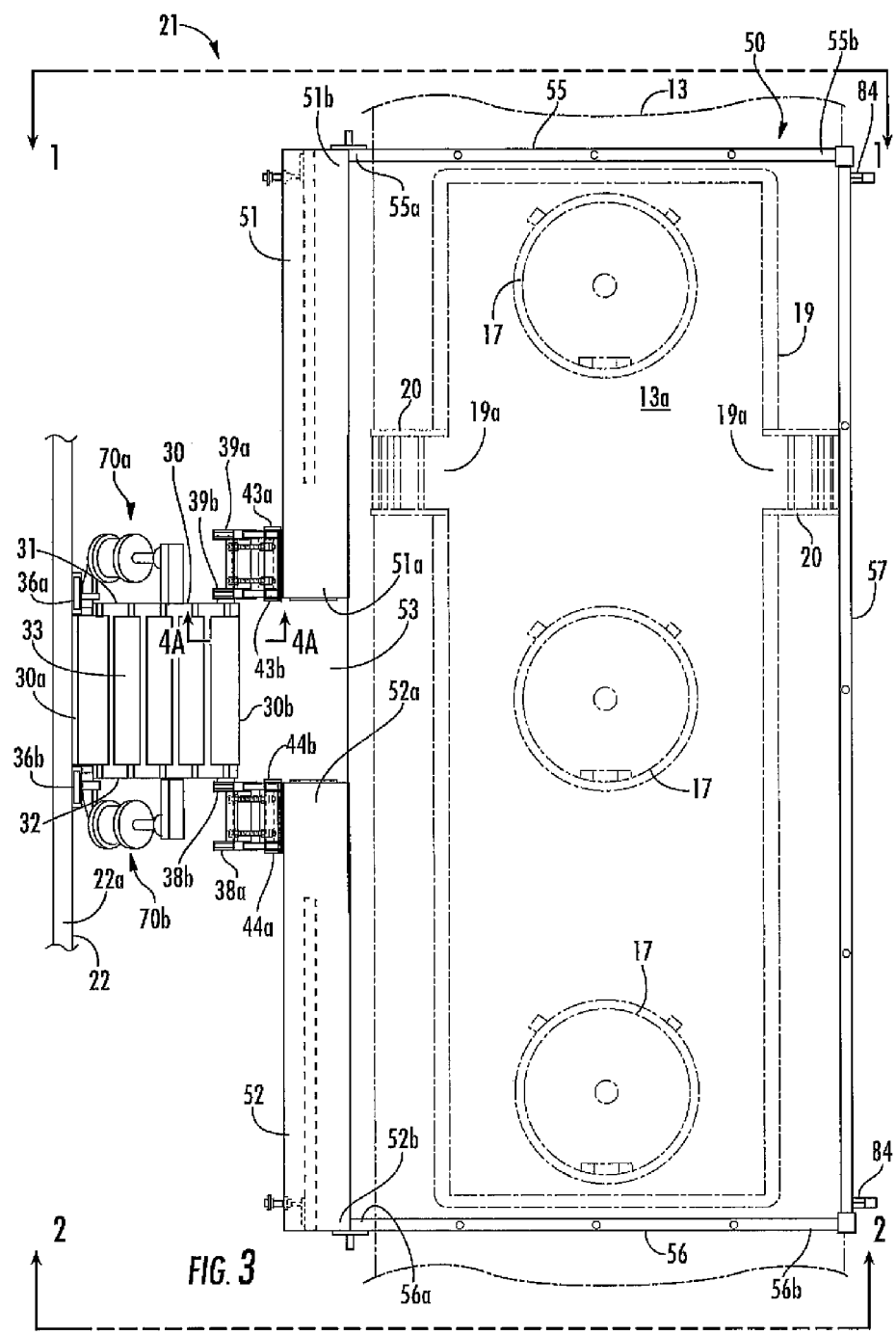
FIG. 3 is a top plan view taken in FIG. 2 along the sight lines of the arrows designated 3-3 of an embodiment of a selectively deployable fall protection enclosure disposed in the working orientation above a railroad tank car shown in dashed outline.

Because of the curved shape of the top 13a of the main body of the tank 13 and/or the likelihood of encountering slippery surfaces thereon, provision must be made for protection of workers who might slip and fall from the top 13a of the tank 13. As shown in chain-dashed outline in FIGS. 1 and 3 for example, often the top 13a of the storage container 13 carried on such railcars 14 is outfitted with a railing system 19 that provides a fence around the top 13a of the tank 13. As schematically shown in FIGS. 1 and 3 for example, the width dimension of such railing system 19 typically measures between five and six feet. As schematically shown in FIG. 3 for example, the length dimension of the railing system 19 typically measures at least long enough to encompass the hatches 17 and may extend to as much as fifteen feet or more depending on the tank's length and the configuration of the tank 13 and/or its hatch(es) 17 and the number of such hatches 17.

As shown in chain-dashed outline in FIGS. 1 and 3, one or more ladders 20 may be provided and extend from the top 13a of the tank 13 down the sides of the tank 13 so that workers can climb the ladder 20 to gain access to the top of the tank 13. As shown in FIG. 3, in order to permit worker access to the top 13a of the tank 13 without the worker having to step over the uppermost rail of the railing system 19, the uppermost rail of such railing system 19 may be provided with a gap 19a where the top of the ladder 20 terminates.

As shown in FIG. 1 for example, the uppermost rail of such railing system 19 may rise to the level of the top of the hatch 17 and typically is no more than about 30 inches above the highest point of the top 13a of the tank 13 and thus is not tall enough above the top 13a of the tank 13 to function as a handrail for workers walking on the top 13a of the tank 13. As shown in FIG. 1 for example, the railing system 19 may include a middle rail 19b extending horizontally about half the vertical distance between the highest point of the top 13a of the tank 13 and the uppermost rail, but the railing system 19 generally is composed of large open, unobstructed areas.

FIGS. 1-3 depict an embodiment of an apparatus that provides selectively deployable worker access to at least a portion of the top 13a of a container 13 disposed above the ground and generally indicates same by the reference numeral 21. Moreover, the apparatus 21 provides fall protection. The container shown in FIGS. 1-3 is a tank 13 on a railcar 14, but such container 13 also could be carried on a truck for example. While some embodiments of the apparatus 21 may include an elevated platform 22, the two main components of the apparatus 21 are a gangway 30 and an enclosure that often is called a fall protection cage 50. As used herein, the term inboard means closer to or in a direction toward the platform 22 and away from the side of the tank 13 that is closer to the platform 22, while the opposite term outboard means farther from or in a direction away from the platform 22.

As noted above, some embodiments of the apparatus 21 of the present invention may include an elevated platform, which is schematically represented in FIG. 3 by the element designated by the numeral 22. The details of the platform 22 are varied and conventional and can be learned from one or more of U.S. Pat. Nos. 4,679,657; 5,042,612; 5,392,878; 7,140,467; 7,216,741 and 8,015,647; the disclosure of each of the foregoing patents being hereby incorporated herein in its entirety for all purposes by this reference. As schematically shown in FIGS. 1-3, the elevated platform typically has a deck 22a suspended above the ground that underlies the platform 22. The embodiments of the apparatus 21 of the present invention typically are retrofitted to platforms 22 that already exist.

Figures 11, 12:
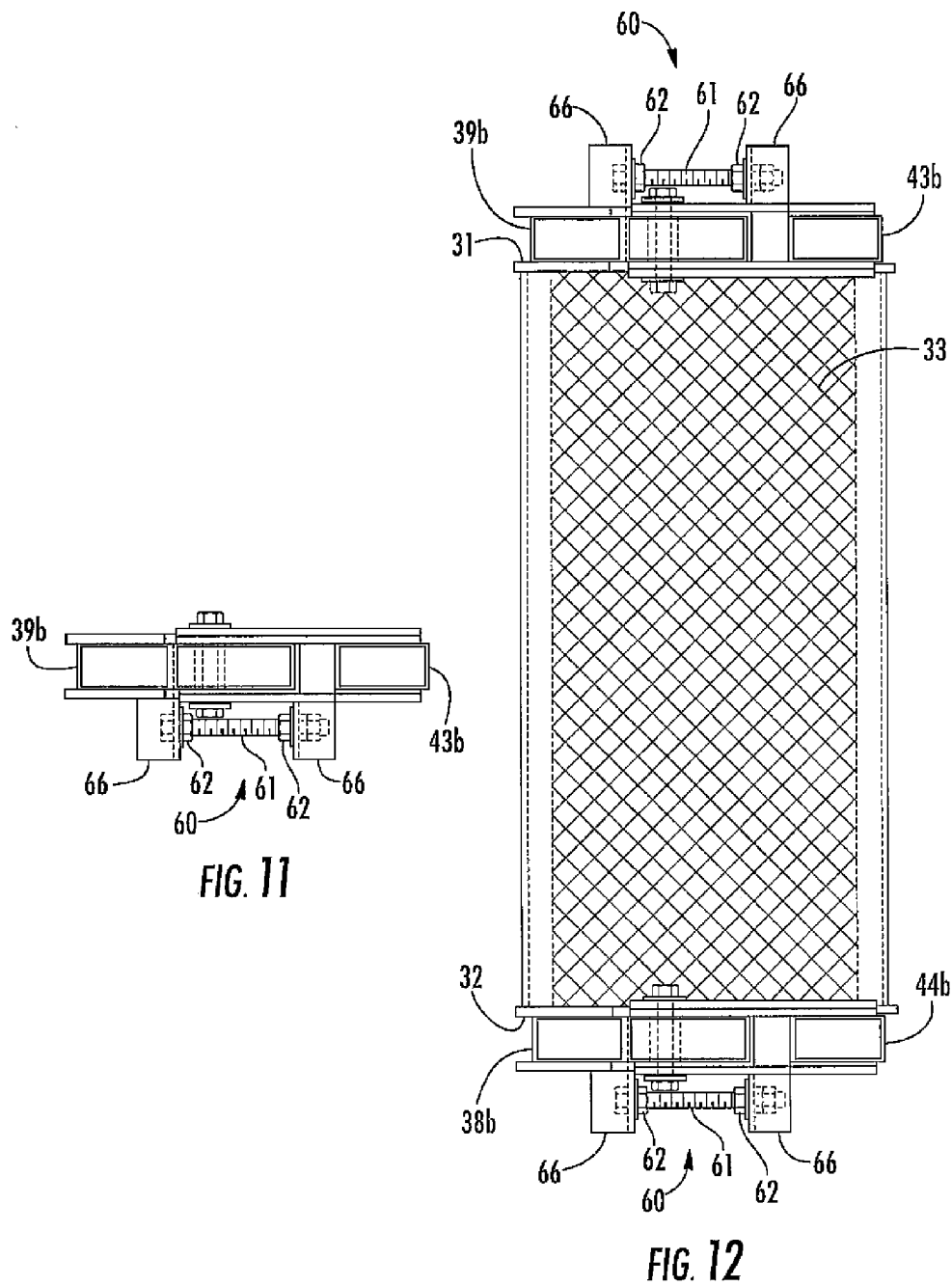
FIG. 11 is a top plan view taken in FIG. 9A along the sight lines of the arrows designated 11-11 of an embodiment of components of a fall protection cage deployable from a loading platform.
FIG. 12 is a top plan view taken in FIG. 10A along the sight lines of the arrows designated 12-12 of an embodiment of components of a fall protection cage deployable from a loading platform.

As embodied herein and indicated generally by the numeral 30 in FIGS. 1-3 for example, the apparatus 21 desirably includes a gangway 30 that elongates inn outboard direction and having an inboard end 30a pivotally connected to the platform 22 and an outboard end 30b extending opposite the inboard end 30a. As embodied herein and shown in FIG. 3 for example, the width of the gangway 30 is defined between a first side 31 of the gangway 30 and a second side 32 of the gangway 30 opposing the first side 31 of the gangway 30. As shown in FIGS. 3 and 12 for example, the gangway 30 provides a walking surface 33 upon which workers can walk from the platform 22 onto the top 13a of the tank 13. In its operative orientation shown in FIGS. 2 and 3 for example, the walking surface 33 extends generally horizontally between the platform 22 and the top 13a of the tank 13 that is to be accessed by workers for inspection, loading or unloading. In its stored orientation shown in FIG. 1 for example, the gangway 30 and its walking surface 33 is pivoted above the platform and disposed generally at an angle with respect to the platform 22.

As shown in FIGS. 1 and 2 for example, the walking surface 33 of the gangway 30 typically is bounded on each respective opposite side by a gangway railing that is indicated generally by the numeral 34. The gangway railing 34 desirably is configured so that it can fold to permit the gangway 30 to be selectively raised above the normal horizontal walking plane and lowered to dispose the walking surface 33 of the gangway 30 in a position suited for workers to move between the top 13a of the tank 13 and the platform 22.

As embodied herein and shown in FIGS. 1-3 for example, the apparatus 21 can include a pair of inboard uprights 36a and 36b. In each of the views of FIGS. 1 and 2, one of the inboard upright 36a or 36b is hidden directly behind the other inboard upright 36a or 36b. As shown in FIGS. 1 and 2 for example, the inboard uprights 36a and 36b can be carried by the platform 22 and anchored thereto, either directly or through one or more braces 37. As shown in FIGS. 1 and 2 for example, each inboard upright 36a and 36b can serve to support the respective proximal end of a respective gangway railing member 34 that desirably is disposed above the walking surface 33 of the gangway 30 along one of the two opposite sides 31, 32 thereof.

In the exemplary embodiment shown in FIGS. 1 and 2, each gangway railing 34 includes a top rail 34a disposed farthest from the walking surface 33 of the gangway 30 and a mid rail 34b disposed relatively midway between the top rail 34a and the walking surface 33 of the gangway 30. As shown in FIGS. 1 and 2 for example, each inboard end of each top rail 34a and mid rail 34b of each railing member 34 desirably is pivotally attached to one of the inboard uprights 36a or 36b.

As embodied herein and shown in FIGS. 3, 9A, 9B, 10A, 10B, 11 and 12 for example, the apparatus 21 desirably includes at least a first stanchion 39b extending vertically above the gangway 30 and having a vertically lower end pivotally connected to one of the sides 31 near the outboard end 30b of the gangway 30 and disposed to the one side 31 of the gangway 30. As embodied herein and shown in FIGS. 3 and 12 for example, at least a second stanchion 38b extends vertically above the gangway 30 and connected to one of the sides 32 near the outboard end of the gangway 30 and disposed to the other side 32 of the gangway 30. In the embodiments depicted in FIGS. 11 and 12 for example, each side 31 or 32 of the gangway is provided with only one stanchion 38b or 39b for example.

However, in the embodiment depicted in FIGS. 1-3 for example, at least a pair of first stanchions 39a, 39b extends vertically above a first side 31 of the outboard end 30b of the gangway 30, and each of these first stanchions 39a, 39b has a vertically lower end pivotally connected to the gangway 30. In the embodiment depicted in FIGS. 1-3 for example, at least a second pair of second stanchions 38a, 38b extends vertically above the second side 32 of the gangway 30, and each second stanchion 38a, 38b in this second pairing has a vertically lower end pivotally connected near the outboard end 30b of the gangway 30. Thus, each stanchion 38a, 38b, 39a, 39b is meant to be pivotally fixed, which is to say pivotally anchored, near the outboard end 30b of the gangway 30 in a manner that permits pivotal relative movement between the lower end of the stanchion 38a, 38b, 39a, 39b and the outboard end 30b of the gangway 30.

Figures 4A, 4B:
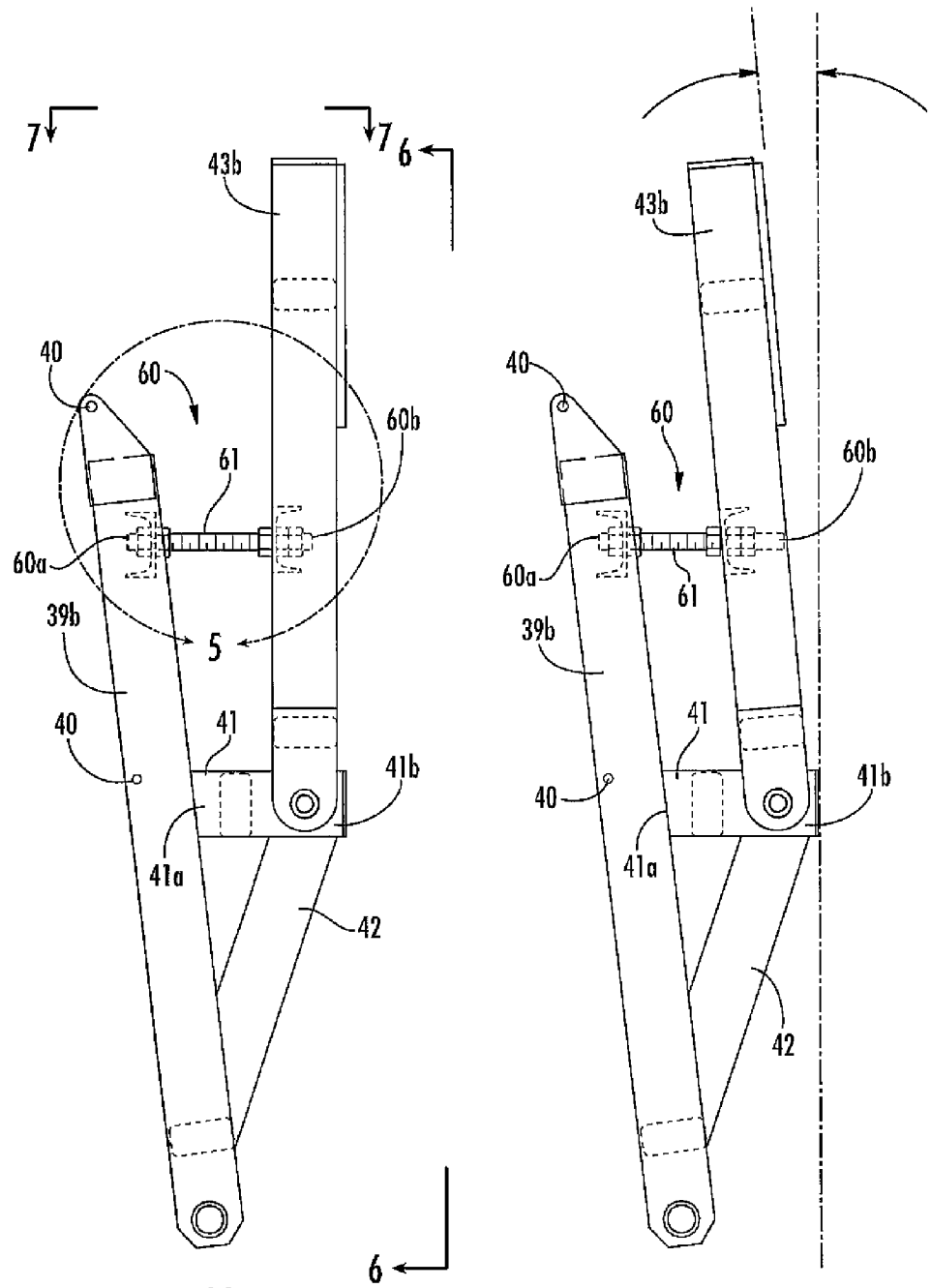
FIG. 4A is a front plan view taken in FIG. 3 along the sight lines of the arrows designated 4A-4A of a first orientation of an embodiment of components a fall protection cage deployable from a loading platform.
FIG. 4B is a front plan view taken in FIG. 3 along the sight lines of the arrows designated 4A-4A of a second orientation of an embodiment of components of a fall protection cage deployable from a loading platform.

As shown in FIGS. 1 and 2 for example, each outboard end of each top rail 34a and mid rail 34b of each railing member 34 of the gangway 30 desirably is pivotally attached to one of the stanchions 38b, 39b in a manner so that the orientation of each top rail 34a and mid rail 34b of each railing member 34 desirably remains generally parallel to the orientation of the walkway surface 33. As shown in FIGS. 4A and 4B for example, such attachment of a respective top rail 34a and mid rail 34b can be via one of the respective openings 40 desirably defined in the respective top portion and mid portion of a stanchion 39b.

An enlarged view of at least one of the stanchions 39b is shown in the view of FIGS. 4A and 4B. As depicted therein, the apparatus desirably includes at least a first spacer bar 41 having an inboard end 41a and an outboard end 41b extending opposite the inboard end 41a. The inboard end 41a of the first spacer bar 41 is connected rigidly and in an unmoving manner to the first stanchion 39b. The first spacer bar 41 then extends away from the first stanchion 39b and from the gangway 30 (not visible in the view shown in FIGS. 4A and 4B) in a direction outboard from the first stanchion 39b to the outboard end 41b of the first spacer bar 41. Though not visible in the view of FIGS. 4A and 4B, the second stanchion 38b of the apparatus 21 similarly includes at least a second spacer bar 41 having an inboard end and an outboard end extending opposite the inboard end. The inboard end of the second spacer bar 41 is similarly connected rigidly and in an unmoving manner to the second stanchion 38b, which is positioned on the opposite side of the gangway 30 from the position of the first stanchion 39b. The second spacer bar 41 then extends away from the second stanchion 38b and from the gangway 30 in a direction outboard from the second stanchion 38b to the outboard end of the second spacer bar 41.

Figure 7:
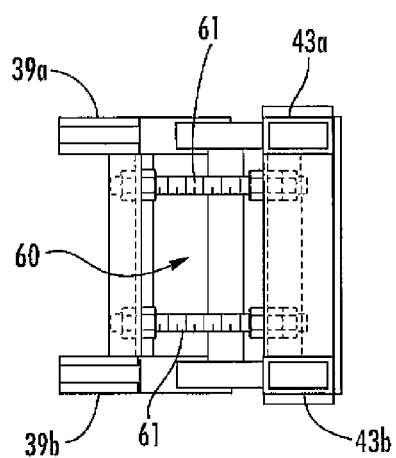
FIG. 7 is a top plan view taken in FIG. 4A along the sight lines of the arrows designated 7-7 of an embodiment of components of a fall protection cage deployable from a loading platform.
Figure 6:
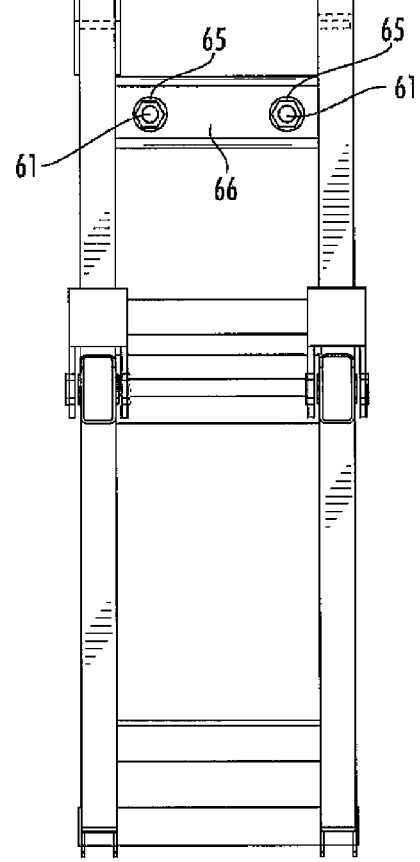
FIG. 6 is a front plan view taken in FIG. 4A along the sight lines of the arrows designated 6-6 of an embodiment of components of a fall protection cage deployable from a loading platform.

In embodiments of the apparatus 21 such as shown in FIGS. 3 and 7 having a first pair of stanchions 38a, 38b disposed to one side of the gangway 30 and a second pair of stanchions 39a, 39b on the other side of the gangway 30, each stanchion in each pair desirably is provided with its own spacer bar 41, which is configured and disposed as described above. Thus, this same arrangement and configuration pertains to the second pair of stanchions 38a, 38b disposed to the second side 32 of the gangway 30 as shown in FIG. 3 for example.

In the embodiment shown in FIGS. 4A and 4B for example, each spacer bar 41 desirably is supported by a brace 42 having one end rigidly connected to the outboard end 41b of the spacer bar 41 and an opposite end rigidly connected to the respective stanchion 39b at a point vertically above where the lower end of the stanchion 39b is pivotally connected to the gangway 30. Thus, as shown in FIGS. 4A and 4B for example, with the stanchion 39*b* and the spacer bar 41, each brace 42 desirably forms the hypotenuse of a right triangle.

As shown in FIGS. 1, 2, 3, 4A and 4B for example, the apparatus 21 desirably includes at least a first adjustable abutment 43*b* extending vertically above the gangway 30 to one opposite side 31 of the gangway 30 and having a vertically lower end connected to the first stanchion 39*b*. As shown in FIGS. 4A and 4B for example, the first adjustable abutment 43*b* desirably is pivotally connected to the first stanchion 39*b* via the first spacer bar 41 by being pivotally connected to the outboard end 41*a* of the first spacer bar 41, which desirably has its inboard end 41*a* rigidly fixed to the stanchion 39*b*. The first spacer bar 41 desirably extends at a right angle from the stanchion 39*b*. Similarly, in the embodiment shown in FIG. 3 for example, the apparatus 21 desirably includes at least a second adjustable abutment 44*b* extending vertically above the gangway 30 to the other opposite side 32 of the gangway 30. In a manner similar to the first adjustable abutment 43*b* shown in FIG. 1 for example, the second adjustable abutment 44*b* has a vertically lower end connected to the outboard end of a second spacer bar 41 and the second adjustable abutment 44*b* is pivotally connected to the second stanchion 38*b* via the second spacer bar 41.

In the embodiments depicted in FIGS. 11 and 12 for example, each side 31 or 32 of the gangway 30 is provided with only one adjustable abutment 44*b* or 43*b* pivotally connected to its respective one stanchion 38*b* or 39*b* for example. In the embodiments shown in FIGS. 9A, 9B, 10A and 10B for example, each adjustable abutment 43 or 44 also desirably is pivotally connected to the associated stanchion 38 or 39 via the spacer bar 41. However, in the embodiments shown in FIGS. 9A, 9B, 10A and 10B for example, the outboard end 41*b* of the spacer bar 41 desirably is fixed rigidly to each adjustable abutment 43 or 44 and desirably extends at a right angle from the adjustable abutment 43 or 44 while the inboard end 41*a* of the spacer bar 41 desirably is pivotally connected to the associated stanchion 38 or 39.

As shown in FIGS. 3, 4A, 4B and 7 for example, in embodiments having a pair of stanchions 39*a*, 39*b* to the first opposite side 31 of the gangway 30 and a pair of stanchions 38*a*, 38*b* to the second opposite side 32 of the gangway 30, the apparatus 21 desirably includes an associated respective pair of adjustable abutments 43*a*, 43*b* extending vertically above and to one opposite side 31 of the gangway 30 and an associated respective pair of adjustable abutments 44*a*, 44*b* extending vertically above and to the other opposite side 32 of the gangway 30. As shown in FIGS. 4A and 4B for example, a first one of the first adjustable abutments 43*b* has a vertically lower end connected to the outboard end 41*b* of a first one of the first spacer bars 41, and the first one of the first adjustable abutments 43*b* is pivotally connected to the first one of the first stanchions 39*b* via the first one of the first spacer bars 41. In the view of FIGS. 4A and 4B, a second one of the first adjustable abutments 43*a* in the first pair is hidden behind the first one of the first adjustable abutments 43*b* but similarly has a vertically lower end connected to the outboard end of a second one of the first spacer bars 41, and the second one of the first adjustable abutments 43*a* is pivotally connected to the second one of the first stanchions 39*a* via the second one of the first spacer bars 41. As shown in FIG. 3 for example, the same arrangement is duplicated for the pair of stanchions 38*a*, 38*b* disposed to the opposite side 32 of the gangway 30, and thus a pair of second adjustable abutments 44*a*, 44*b* extends vertically above the opposite side 32 of the gangway 30 with a first one of the second adjustable abutments 44*a* having a vertically lower end connected to the outboard end of a first one of the second spacer bars 41, and the first one of the second adjustable abutments 44*a* is pivotally connected to the first one of the second stanchions 38*a* via the first one of the second spacer bars 41. Moreover, a second one of the second pair of adjustable abutments 44*b* has a vertically lower end connected to the outboard end of a second one of the second spacer bars 41, and the second one of the second adjustable abutments 44*b* is pivotally connected to the second one of the second stanchions 38*b* via the second one of the second spacer bars 41.

As embodied in FIGS. 1-3 for example, the apparatus 21 desirably includes a fall protection cage that is generally indicated by the designating numeral 50. The fall protection cage 50 is carried by the adjustable abutments 43, 44 and desirably has an inboard side that is disposed closer to the gangway 30. The fall protection cage 50 desirably has an outboard side 57 that is disposed farthest from the gangway 30 and opposite the inboard side of the fall protection cage 50. As schematically shown in FIG. 3 for example, when the apparatus 21 is deployed in an operative orientation with respect to the top 13*a* of the tank 13, the inboard side of the fall protection cage 50 will elongate in a direction that is generally parallel to the length axis of the tank 13 and be positioned on the side of the tank 13 that is closer to the gangway 30, while the outboard side 57 of the fall protection cage 50 will elongate in a direction that is generally parallel to the inboard side of the fall protection cage 50 and parallel to the length axis of the tank 13 and be positioned on the side of the tank 13 that is farther away from the gangway 30.

In the embodiments shown in FIGS. 1 and 3 for example, the fall protection cage 50 of the apparatus 21 desirably includes a first truss box member 51 having a proximal end 51*a* rigidly connected to at least one of the adjustable abutments 43 disposed to one side 31 of the gangway 30. In embodiments such as shown in FIG. 3 in which a pair of adjustable abutments 43*a*, 43*b* is disposed to one side 31 of the gangway 30, then the proximal end 51*a* of the first truss box member 51 desirably is connected rigidly to each one of the adjustable abutments 43*a*, 43*b* disposed to one side 31 of the gangway 30. Similarly, in the embodiments shown in FIGS. 2 and 3 for example, the apparatus 21 desirably includes a second truss box member 52 having a proximal end 52*a* rigidly connected to at least one of the adjustable abutments 44 disposed to the other side 32 of the gangway 30. In embodiments such as shown in FIG. 3 in which a pair of adjustable abutments is disposed to each side of the gangway 30, then the proximal end 52*a* of the second truss box member 52 desirably is connected rigidly to each one of the adjustable abutments 44*a*, 44*b* disposed to that second side 32 of the gangway 30.

As shown in FIGS. 1 and 2 for example, the proximal end 51*a*, 52*a* of each respective truss box member 51, 52 desirably is rigidly connected to the uppermost portion(s) of the respective adjustable abutment(s) 43, 44. Moreover, each of the truss box members 51, 52 is configured and constructed robustly enough to withstand any sagging over the lengths thereof from their proximal ends 51*a*, 52*a* to their respective distal ends 51*b*, 52*b*. The two truss box members 51, 52 desirably are disposed generally in straight alignment to form the inboard side of the fall protection cage 50. The distance between the proximal ends 51*a*, 52*a* of the two respective truss box members 51, 52 defines an entrance opening 53 into the fall protection cage 50 from the gangway 30 and thus defines an entrance opening 53 configured to allow ingress and egress of workers into and out of, respectively, the fall protection cage 50 via the gangway 30.

The fall protection cage 50 desirably includes a first cantilever and a second cantilever. The cantilevers form the sections of the fall protection cage 50 that span between the inboard side of the fall protection cage 50 and the outboard side 57 of the fall protection cage 50. In the embodiment of the apparatus 21 shown in FIG. 3 for example, a first cantilever 55 desirably is disposed to one side 31 of the gangway 30, and a second cantilever 56 desirably is disposed to the other side 32 of the gangway 30. In the embodiment shown in FIG. 3 for example, each cantilever 55 desirably elongates in a direction so as to be parallel to the other cantilever 56. In the embodiments shown in FIGS. 1-3, 9A and 9B for example, each cantilever 55, 56 desirably is formed by an upper rail 54 and a lower rail 59 disposed vertically beneath the upper rail 54. In the embodiments shown in FIGS. 10A and 10B for example, each cantilever 55, 56 desirably is formed by an upper rail 54, a lower rail 59 disposed vertically beneath the upper rail 54, and a middle rail 58 disposed vertically beneath the upper rail 54 and vertically above the lower rail 59.

As shown in FIG. 3 for example, the first cantilever 55 has an inboard end 55a connected to the first adjustable abutment 43 on a first side 31 of the gangway 30. The inboard end 55a of the first cantilever 55 desirably is connected to the first adjustable abutment 43 via a connection of the inboard end 55a of the first cantilever 55 to the distal end 51b of the first truss box member 51. A similar arrangement is provided to the other side 32 of the gangway 30. Accordingly, the second cantilever 56 has an inboard end 56a connected to the second adjustable abutment 44 on the opposite side 32 of the gangway 30. The inboard end 56a of the second cantilever 56 desirably is connected to the second adjustable abutment 44 via a connection of the inboard end 56a of the second cantilever 56 to the distal end 52b of the second truss box member 52. As schematically shown in FIG. 3 for example, when the apparatus 21 is deployed in an operative orientation with respect to the top 13a of the tank 13, each cantilever 55, 56 of the fall protection cage 50 desirably will be positioned generally transversely to the length axis of the tank 13 and span over and across the width dimension of the tank 13.

As embodied herein and shown in FIG. 3 for example, the fall protection cage 50 desirably includes an outboard side 57 that desirably elongates lengthwise in a direction that is parallel to the direction of lengthwise elongation of the two truss box members 51, 52. The outboard end 55b of the first cantilever 55 is connected to one of the opposite ends of the outboard side 57 of the fall protection cage 50. Similarly, the outboard end 56b of the second cantilever 56 is connected to the other one of the opposite ends of the outboard side 57 of the fall protection cage 50. Though not visible in the views shown, in the embodiments of the fall protection cage 50 depicted in FIGS. 1, 2, 8, 9A and 9B, the outboard side 57 of the fall protection cage 50 desirably includes an upper rail 54 and a lower rail 59. Though not visible in the views shown, in the embodiments of the fall protection cage 50 depicted in FIGS. 10A and 10B, the outboard side 57 of the fall protection cage 50 desirably includes at least a middle rail 58 disposed between the upper rail 54 and the lower rail 59.

As the sizes of the fall protection cages have grown to accommodate ever larger tanks 13, the weights of the cages dictated use of aluminum for the rails that form the cantilevers 55, 56. However, cantilevers 55, 56 that are formed of aluminum tend to sag under the weight of the outboard side 57 of the fall protection cage 50. In order to ensure that the fall protection cage 50 leaves adequate height clearance above the hatches 17 rising above the tops 13a of the tanks 13, the apparatus 21 of present invention provides a mechanism that allows adjustments to be made to the elevation of the outboard side 57 of the fall protection cage 50. As embodied in FIGS. 4A, 4B and 5 for example, the apparatus 21 of the present invention desirably includes an elongated length-adjusting member denoted generally by the numeral 60 and having an inboard end 60a connected adjustably to a stanchion 39b and an outboard end 60b extending opposite the inboard end 60a and connected to the adjustable abutment 43b that is pivotally connected to that stanchion 39b. Each elongated length-adjusting member 60 is configured to selectively vary the distance between the stanchion 39 or 38 and the respective adjustable abutment 43 or 44 that is pivotally connected to that stanchion 39 or 38. At the option of the user, each elongated length-adjusting member 60 is configured to selectively fix the distance between the stanchion 39 or 38 and the respective adjustable abutment 43 or 44 that is pivotally connected to that stanchion 39 or 38. As shown in FIG. 4A for example, the inboard end 60a of the elongated length-adjusting member 60 desirably is adjustably connected near the vertically higher end of the stanchion 39b, and the outboard end 60b of the elongated length-adjusting member desirably is connected adjustably to the associated adjustable abutment 43b vertically above the pivotally connected vertically lower end of the adjustable abutment 43b. Each pair of stanchion 39a, 39b, 38a, 38b and respective pivotally connected adjustable abutment 43a, 43b, 44a, 44b desirably is similarly connected with an associated elongated length-adjusting member 60.

Figure 5:
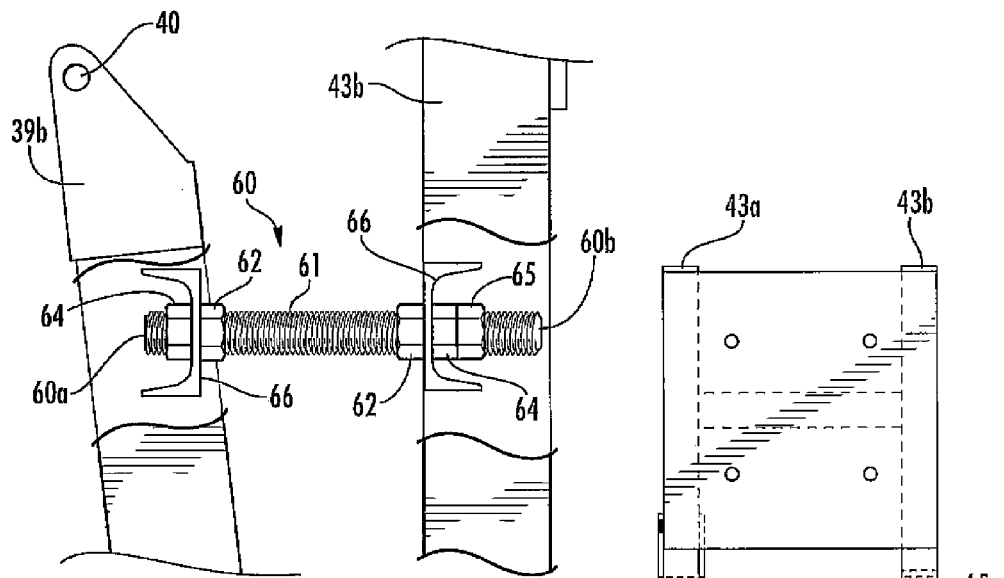
FIG. 5 is an enlarged front plan view of the section in FIG. 4A enclosed in the arrows designated 5 of an embodiment of components of a fall protection cage deployable from a loading platform.

As embodied in FIGS. 5, 11 and 12 for example, each elongated length-adjusting member 60 desirably includes an elongated threaded screw 61 that is threaded over the entire length thereof, and a pair of respective inner and outer threaded nuts 62, 64 and a C-channel bar 66 connects each opposite end of the threaded screw 61 to one of the respective stanchion 39b or adjustable abutment 43b. A threaded locking nut 65 prevents rotation of the outer threaded nut 64 at the outboard end 60b of the elongated length-adjusting member 60 and thus fixes the distance relationship between each respective associated stanchion 39b and adjustable abutment 43b so that the weight of the fall protection cage 50 attached to the adjustable abutments 43, 44 cannot loosen the outer threaded nut 64 at the outboard end 60b of the elongated length-adjusting member 60. Thus, the present invention effects control of the pivoting movement of each adjustable abutment 43, 44 with respect to its associated stanchion 39, 38 with screws 61 that can be locked in place upon attaining the fall protection enclosure's desired orientation that provides the required overhead clearance conforming to the prescribed envelope 18a, 18b (FIGS. 1 and 2).

Figure 9A:
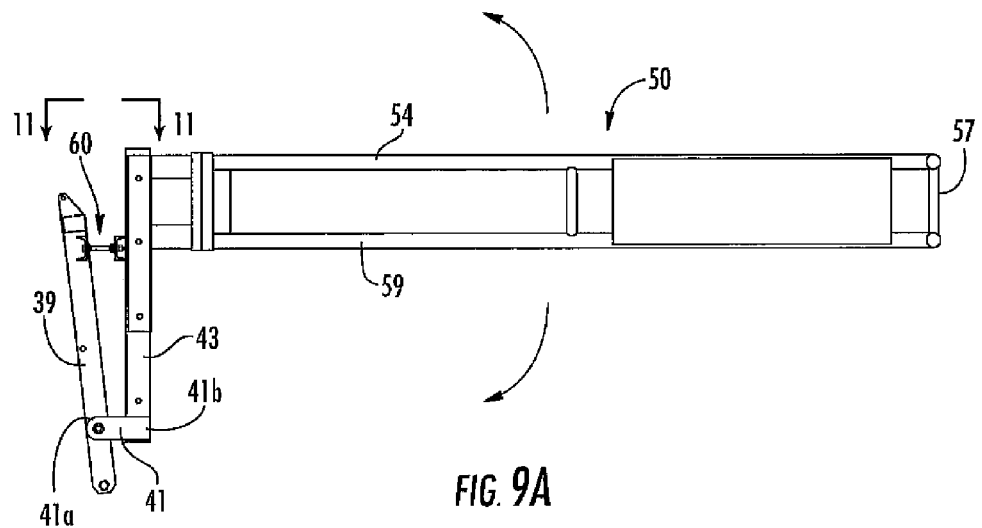
FIG. 9A is a front plan view of an embodiment of components of a fall protection cage deployable from a loading platform.
Figure 9B:
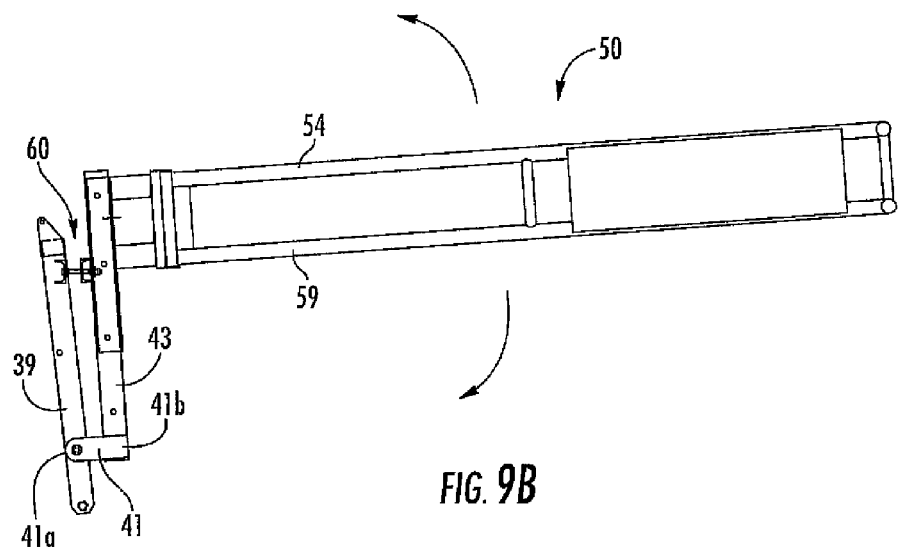
FIG. 9B is a front plan view of an embodiment of components of a fall protection cage deployable from a loading platform.
Figure 10A:
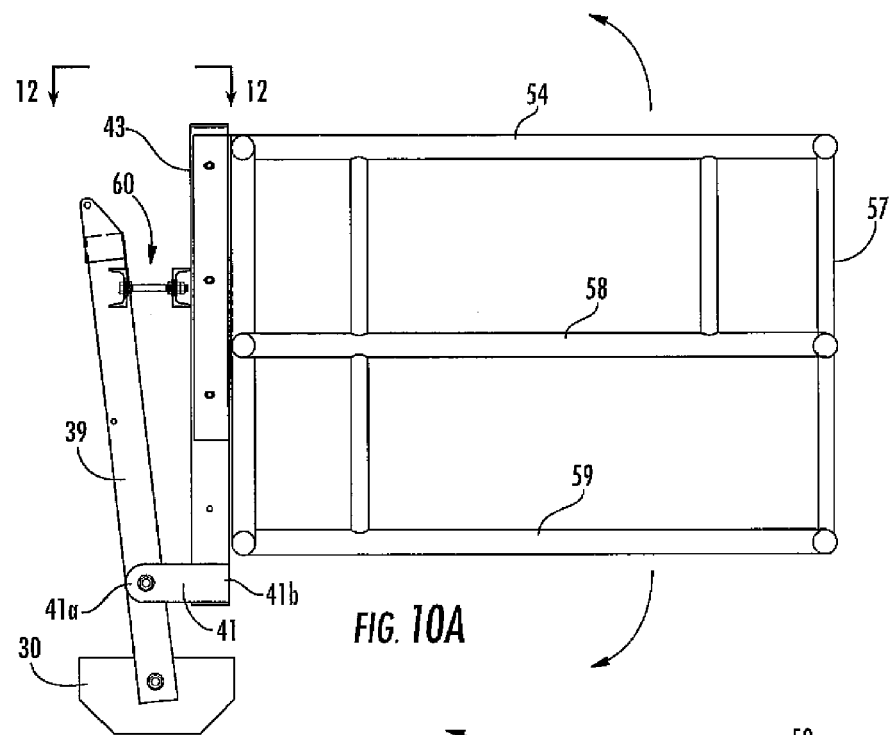
FIG. 10A is a front plan view of an embodiment of components of a fall protection cage deployable from a loading platform.
Figure 10B:
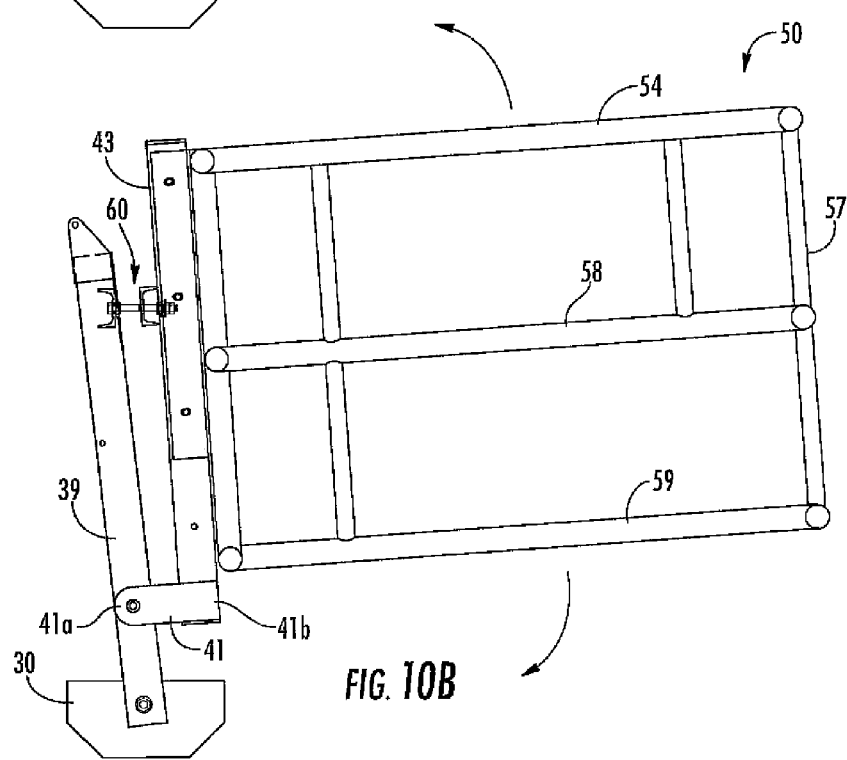
FIG. 10B is a front plan view of an embodiment of components of a fall protection cage deployable from a loading platform.

In a sense, the combination of the stanchion 38, 39 and the respective associated adjustable abutment 44, 43 form a sort of adjustable stanchion that enables adjustment of the degree to which one can compensate for any amount of sag that occurs from the force of gravity acting on the outboard side 57 of the fall protection cage 50 carried by the cantilevers 55, 56. The spacer bar 41 has the effect of giving to the stanchion 38, 39 a greater depth in the direction between the inboard and the outboard, i.e., toward and away from the gangway 30. The depth of the stanchion 38, 39 lays the ground work for an adjustable aspect of the stanchion 38, 39 in the direction between the inboard and the outboard. The pivotal connection between the adjustable abutment 43b and the respective associated stanchion 39b via the spacer bar 41 enables each adjustable abutment 43b to be swung to and fro toward the respective associated stanchion 39b as depicted in FIGS. 4B, 9B and 10B and away from the stanchion 39b as depicted in FIGS. 4A, 9A and 10A.

Figure 8:
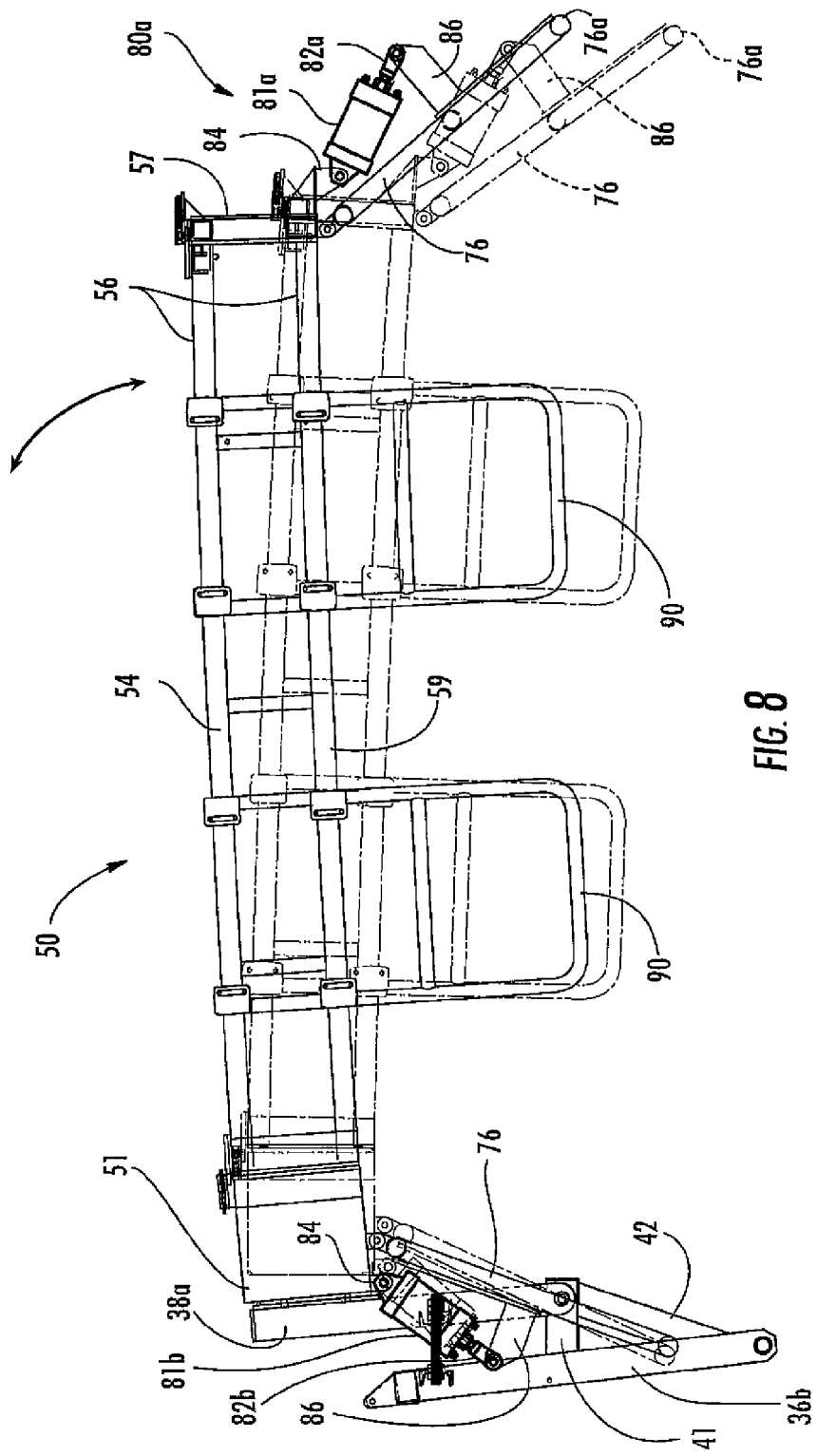
FIG. 8 is a front plan view similar to that taken in FIG. 2 of an embodiment of components of a fall protection cage deployable from a loading platform.

The elongated length-adjusting member 60 provides selective control over the extent of this greater depth of the stanchion in the direction between the inboard and the outboard. The elongated length-adjusting member 60 enables the user to set a particular degree of deflection of the outboard side 57 of the fall protection cage 50 relative to the inboard side of the cage 50 and thus control the clearance distance beneath the outboard end of the cage 50. This is illustrated schematically in FIGS. 4A, 4B, 8, 9A, 9B, 10A and 10B for example. The arrows pointing to the chain-dashed lines in FIG. 4B schematically indicate movement of the adjustable abutment 43b either toward or away from the associated stanchion 39b. The separation between the chain-dashed lines in FIG. 4B schematically indicates the angle through which the adjustable abutment 43b has rotated in the inboard direction toward the associated stanchion 39b relative to the view shown in FIG. 4A. Referring to FIG. 5, this angular movement is effected by rotation of the nuts 62, 64, 65 attaching the adjustable abutment 43b to the screw 61 so that they move along the screw 61 toward the associated stanchion 39b. Referring to FIG. 8, the dashed outline part of the drawing depicts a sagging fall protection cage 50, and the solid line part of the drawing depicts a fall protection cage 50 that has pulled up the outboard side 57 of the fall protection cage 50 to compensate for the sag as might be effected by the sort of movement schematically depicted in FIGS. 4B, 9B and 10B. The singleheaded arrows in each of FIGS. 9A, 9B, 10A and 10B and the double-headed arrows in FIG. 8 schematically represent the angular movements of the fall protection cage 50 that can be effected by rotations of the nuts 62, 64, 65 attaching the adjustable abutment 43 to the screw 61 as shown in FIG. 5 for example. Moreover, because the adjustable abutments 43, 44 are disposed closer to the inboard side of the fall protection cage 50 than to the outboard side 57 of the fall protection cage 50, and indeed are located at the outboard end 30b of the gangway 30, the height clearance adjustments to the outboard side 57 of the fall protection cage 50 can be made while workers are standing on the gangway 30.

As shown in FIGS. 1 and 2, the present invention keeps the fall protection cage 50 generally in a horizontal orientation with respect to the ground by pivoting the gangway 30 with respect to each pair of stanchion 38, 39 and pivotally connected adjustable abutment 44, 43 to which the fall protection cage 50 is attached. As shown in FIGS. 1 and 2 for example, the gangway 30, the stanchions 38, 39 and the railing members 34a, 34b are pivotally connected together to form parallel linkages with one another and with a respective inboard upright 36a, 36b on the same side of the gangway 30. As shown in FIGS. 1-3, the gangway 30 and fall protection cage 50 are configured to be selectively raised and lowered together by double-acting linear motors indicated generally by the designating numeral 70. Each double-acting linear motor 70 has one end pivotally anchored to the platform 22 and the opposite end pivotally connected to the gangway 30. As known in the art, each double-acting linear motor 70, also known as an actuating cylinder, includes a cylinder 71 and a piston 72 selectively extendable from and contractable into the cylinder 71. As known in the art, such double-acting linear motors 70 desirably can be used to selectively move the gangway 30 back and forth between a stored configuration above the designed clearance envelope 18a (FIG. 1) and an operative configuration (FIG. 2) in which workers can walk upon the gangway 30 between the platform 22 and the top 13a of the storage container 13.

In this particular embodiment shown in FIG. 3 for example, a respective double-acting linear motor 70a and 70b is attached between the platform 22 and one respective side 31, 32 of the gangway 30. Each double-acting linear motor 70a, 70b desirably is powered by pressurized air and is a pneumatic cylinder, but alternatively can be a hydraulic cylinder that is powered by hydraulic fluid. When the pistons 72 are extending away from the cylinders 71 as shown in FIG. 1, the gangway 30 is pushed vertically upward away from the ground underlying the platform 22. When the pistons 72 are retracted into the cylinders 71 as shown in FIG. 2, the upper surface of the gangway 30 is disposed generally level with the ground underlying the platform 22 and thus provides a level walking surface 33 for the workers to move between the platform 22 and the top 13a of the container or tank 13 that is to be loaded or unloaded.

There are a number of configurations suitable for using double-acting linear motors 70, and/or single-acting linear motors and/or springs and parallel linkages to urge one end of the parallel linkages in a certain direction. The configuration shown in FIGS. 1-3 is but one of these configurations, and the present invention is not deemed limited to only the illustrated configuration. All such configurations known in the art are intended to be encompassed by the present invention.

In order to ensure that the fall protection cage 50 can safely envelop the tops 13a of the tanks 13 of different widths relative to the span of the two cantilevers 55, 56 or different orientations with respect to the platform 22, the present invention provides a mechanism that allows width adjustments to be made to the effective reach of the outboard side 57 of the fall protection cage 50. As embodied in FIGS. 1, 2 and 8 for example, the apparatus 21 of the present invention desirably includes at least a first depending frame 76 carried pivotally by the outboard side 57 of the fall protection cage 50. One end of the depending frame 76 is pivotally connected to the fall protection cage 50 while the opposite end of the depending frame 76 extends vertically for a substantial distance beneath the outboard side 57 of the fall protection cage 50. In embodiments like those depicted in FIGS. 1, 2, 8, 9A, 9B, 10A and 10B in which the fall protection cage 50 defines an enclosure that includes at least an upper rail 54 and a lower rail 59 disposed beneath the upper rail 54, the free end 76a of the depending frame 76 extends vertically for a substantial distance beneath the lower rail 59 of the outboard side 57 of the fall protection cage 50. Moreover, the first depending frame 76 desirably is pivotally carried by the lower rail 59 of the outboard side 57 of the fall protection cage 50.

As embodied in FIGS. 1 and 8 for example, the apparatus of the present invention desirably includes at least a first double-acting linear motor 80a that includes a cylinder 81a and a piston 82a selectively extendable from and contractable into the cylinder 81a under the control of the operator. One of the cylinder 81a and the piston 82a desirably is pivotally connected to a mount 84 that extends in an outboard direction from the outboard side 57 of the fall protection cage 50. The other one of the cylinder 81a and the piston 82a of the first double-acting linear motor 80a desirably is pivotally connected to the first depending frame 76. Desirably, as shown in FIGS. 1 and 8 for example, the first double-acting linear motor 80a is pivotally connected to the first depending frame 76 via a strut 86 that extends in a direction that is normal to the plane of the depending frame 76 and extending therefrom in the outboard direction. Desirably, though not visible in the views of FIGS. 1 and 8 for example but depicted in the view of FIG. 2, at least a second double-acting linear motor 80b that is like the first and thus includes a cylinder 81b and a piston 82b selectively extendable from and contractable into the cylinder 81b, has one of the cylinder 81b and the piston 82b pivotally connected to a second mount 84 (FIG. 3) that extends in an outboard direction from the outboard side 57 of the fall protection cage 50. The other one of the cylinder 81b and the piston 82b of the second double-acting linear motor 80b is pivotally connected to the depending frame 76 in a manner like the first double-acting linear motor 80a and thus is pivotally connected to the depending frame 76 via a second strut 86 that extends in a direction that is normal to the plane of the depending frame 76 and outboard therefrom.

Referring to FIGS. 1 and 8 for example, when each of the pistons 82*a* of each of the two double-acting linear motors 80*a* is retracted into its respective actuating cylinder 81*a*, the depending frame 76 that is pivotally connected to the outboard side 57 of the fall protection cage 50 is disposed in a generally outboard direction that is away from the outboard side 57 of the fall protection cage 50 and away from the gangway 30 and thus provides in effect a wider fall protection cage 50 for the workers to move around the top 13*a* of the container or tank 13 that is to be loaded or unloaded. This feature that includes the depending frame 76 enables the fall protection cage 50 to accommodate generally wider tanks 13 or tanks 13 that are parked farther away from the platform 22 than is ideally suited to the loading and unloading work.

Referring to FIG. 2 for example, when the ends of the pistons 82*a* are extending away from the respective actuating cylinders 81*a*, the depending frame 76 that is pivotally connected to the outboard side 57 of the fall protection cage 50 is disposed generally in an inboard direction away from the outboard side 57 of the fall protection cage 50 and toward the gangway 30 and thus provides in effect a narrower fall protection cage 50 for the workers to move around the top 13*a* of the container or tank 13 that is to be loaded or unloaded. Accordingly, this feature that includes the depending frame 76 that is pivotally connected to the outboard side 57 of the fall protection cage 50 enables the fall protection cage 50 to accommodate generally narrower tanks 13 or tanks 13 that are parked closer to the platform 22 than is ideally suited to the loading and unloading work. Moreover, because the double-acting linear motors 80*a* disposed on the outboard side 57 of the fall protection cage 50 can be operated remotely, the width clearance adjustments to the outboard side 57 of the fall protection cage 50 can be made before workers step onto the top 13*a* of the tank 13.

In a similar manner shown in FIGS. 1, 2 and 8 for example, the apparatus 21 of the present invention desirably includes at least a second depending frame 76 carried pivotally by the inboard side of the fall protection cage 50 that is defined by the truss box members 51, 52. One end of the depending frame 76 is pivotally connected to the truss box members 51, 52 of the fall protection cage 50 while the opposite end of the second depending frame 76 extends vertically for a substantial distance beneath the truss box members 51, 52 of the fall protection cage 50. In embodiments like those depicted in FIGS. 1, 2, 8, 9A, 9B, 10A and 10B in which the fall protection cage 50 defines an enclosure that includes at least an upper rail 54 and a lower rail 59 disposed beneath the upper rail 54, the free end 76*a* of the depending frame 76 extends vertically for a substantial distance beneath the lower rail 59 of the fall protection cage 50.

As embodied in FIGS. 1 and 8 for example, the apparatus of the present invention desirably includes at least a first double-acting linear motor 80*b* that includes a cylinder 81*b* and a piston 82*b* selectively extendable from and contractable into the cylinder 81*b* under the control of the operator. One of the cylinder 81*b* and the piston 82*b* desirably is pivotally connected to a mount 84 that extends from the underside of the truss box members 51, 52 at the inboard side of the fall protection cage 50. The other one of the cylinder 81*b* and the piston 82*b* of the first double-acting linear motor 80*b* desirably is pivotally connected to the second depending frame 76. Desirably, as shown in FIGS. 1 and 8 for example, the first double-acting linear motor 80*b* is pivotally connected to the second depending frame 76 via a strut 86 that extends in a direction that is normal to the plane of the depending frame 76 and extending therefrom in the inboard direction. Desirably, though not visible in the views of FIGS. 1 and 8 for example but depicted in the view of FIG. 2, at least a second double-acting linear motor 80*b* that is like the first and thus includes a cylinder 81*b* and a piston 82*b* selectively extendable from and contractable into the cylinder 81*b*, has one of the cylinder 81*b* and the piston 82*b* pivotally connected to a second mount 84 (FIG. 3) that extends from the underside of the truss box member 52 of the fall protection cage 50. The other one of the cylinder 81*b* and the piston 82*b* of the second double-acting linear motor 80*b* is pivotally connected to the second depending frame 76 in a manner like the first double-acting linear motor 80*b* and thus is pivotally connected to the second depending frame 76 via a second strut 86 that extends in a direction that is normal to the plane of the depending frame 76 and inboard therefrom.

Referring to FIGS. 1 and 8 for example, when each of the pistons 82*b* of each of the two double-acting linear motors 80*b* is extended away from its respective actuating cylinder 81*b*, the second depending frame 76 that is pivotally connected to the inboard side of the fall protection cage 50 is disposed in a generally inboard direction that is toward the gangway 30 and away from the outboard side 57 of the fall protection cage 50 and thus provides in effect a wider fall protection cage 50 for the workers to move around the top 13*a* of the container or tank 13 that is to be loaded or unloaded. This feature that includes the second depending frame 76 enables the fall protection cage 50 to accommodate generally wider tanks 13 or tanks 13 that are parked closer to the platform 22 than is ideally suited to the loading and unloading work.

Referring to FIG. 2 for example, when the ends of the pistons 82*b* are retracted into the respective actuating cylinders 81*b*, the second depending frame 76, which is pivotally connected to the inboard side of the fall protection cage 50, is disposed generally in an outboard direction toward the outboard side 57 of the fall protection cage 50 and away from the gangway 30 and thus provides in effect a narrower fall protection cage 50 for the workers to move around the top 13*a* of the container or tank 13 that is to be loaded or unloaded. Accordingly, this feature that includes the second depending frame 76 that is pivotally connected to the inboard side of the fall protection cage 50 enables the fall protection cage 50 to accommodate generally narrower tanks 13 or tanks 13 that are parked farther from the platform 22 than is ideally suited to the loading and unloading work. Moreover, because the double-acting linear motors 80*b* disposed on the inboard side of the fall protection cage 50 can be operated remotely, the width clearance adjustments to the inboard side 57 of the fall protection cage 50 can be made before workers step onto the top 13*a* of the tank 13.

As embodied herein, each of the first and second depending frames 76 can be provided by a single member that runs the entire length of the fall protection cage 50. Alternatively, each of the first and second depending frames 76 can be provided by at least two sections, each section running only a portion of the entire length of the fall protection cage 50 and having its own separately actuatable double-acting linear motor 80*a*, 8*b*. Moreover, each section of each depending frame 76 need not cover the same portion of the length of the fall protection cage 50 as the other section of that depending frame 76 on one side, whether inboard or outboard, of the fall protection cage 50.

As shown in FIGS. 1, 2 and 8 for example, one or more gates 90 can be provided to the portions of the fall protection cage defined by the cantilevers 55, 56. Each gate 90 can have one end pivotally connected to one of the cantilevers 55, 56 and have its opposite free end extend beneath the cantilevers 55, 56. As shown in FIG. 8 for example, each gate 90 has one end pivotally connected to the upper rail 54 of one of the cantilevers 55 and has its opposite free end extend beneath the lower rail 59 of that cantilever 55. These gates 90 effectively extend the depth of the fall protection cage 50 to reach the tops 13a of tanks 13 that are disposed at relatively lower elevations than the height of the deck 22a of the platform 22 for example.

While at least one presently preferred embodiment of the invention has been described using specific terms, such description is for illustrative purposes only, and it is to be understood that changes and variations may be made without departing from the spirit or scope of the following claims. This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An apparatus that provides selectively deployable worker access with fall protection to at least a portion of the top of a container disposed above the ground, the apparatus comprising:
   a. an elevated platform having a deck suspended above the ground on which the platform is standing;
   b. a gangway having an inboard end pivotally connected to the platform and an outboard end extending opposite the inboard end;
   c. at least a first stanchion extending vertically above the gangway and having a vertically lower end pivotally connected to the gangway;
   d. at least a first spacer bar having an inboard end and an outboard end extending opposite the inboard end, the inboard end being connected to the first stanchion, the outboard end extending away from the first stanchion and from the gangway in a direction outboard from the first stanchion;
   e. at least a first adjustable abutment extending vertically above the gangway and having a vertically lower end connected to the outboard end of the first spacer bar and wherein the first adjustable abutment is pivotally connected to the first stanchion via the first spacer bar;
   f. a fall protection cage having an inboard side connected to the first adjustable abutment; and
   g. a first elongated length-adjusting member having an inboard end connected to the first stanchion and an outboard end extending opposite the inboard end and connected to the first adjustable abutment and wherein the first elongated length-adjusting member is configured to selectively vary the distance between the first stanchion and first adjustable abutment.

2. The apparatus of claim 1, wherein the first elongated length-adjusting member includes an elongated threaded screw.

3. The apparatus of claim 1, wherein the inboard end of the first elongated length-adjusting member is connected near the vertically higher end of the first stanchion and the outboard end of the first elongated length-adjusting member is connected to the first adjustable abutment vertically above the vertically lower end of the first adjustable abutment.

4. The apparatus of claim 1, wherein the fall protection cage defines an enclosure that includes at least an upper rail and a lower rail disposed beneath the upper rail and that defines an entrance opening configured to permit ingress and egress of workers via the gangway.

5. The apparatus of claim 4, further comprising at least a first depending frame carried by at least one of the upper rail and the lower rail and extending vertically beneath the lower rail.

6. The apparatus of claim 4, wherein the enclosure has an inboard side and an outboard side, the first adjustable abutment being disposed closer to the inboard side of the enclosure than to the outboard side of the enclosure.

7. The apparatus of claim 5, further comprising:
   a. a first double-acting linear motor that includes a cylinder and a piston selectively extendable from and contractable into the cylinder, wherein one of the cylinder and the piston being pivotally connected to the enclosure; and
   b. wherein the first depending frame includes a pivoting section having one end pivotally connected to the enclosure of the fall protection cage, the first depending frame also being pivotally connected to the other one of the cylinder and the piston of the first double-acting linear motor.

8. The apparatus of claim 7, wherein the pivoting section of the first depending frame has one end pivotally connected to the outboard side of the enclosure.

9. The apparatus of claim 7, wherein the pivoting section of the first depending frame has one end pivotally connected to the inboard side of the enclosure.

10. The apparatus of claim 1, wherein the gangway having an inboard end pivotally connected to the platform and an outboard end extending opposite the inboard end in the lengthwise direction, the width of the gangway being defined between a first side of the gangway and a second side of the gangway opposing the first side, wherein the first stanchion is disposed to the first side of the gangway and wherein the fall protection cage is carried at least partially by the second adjustable abutment, the apparatus further comprising:
   a. at least a second stanchion extending vertically above the gangway and connected thereto and disposed to the second side of the gangway;
   b. at least a second spacer bar having an inboard end and an outboard end extending opposite the inboard end, the inboard end being connected to the second stanchion, the outboard end extending away from the gangway and the second stanchion in a direction outboard from the second stanchion;
   C. at least a second adjustable abutment extending vertically above the gangway and having a vertically lower end connected to the outboard end of the second spacer bar and wherein the second adjustable abutment is pivotally connected to the second stanchion via the second spacer bar;
   d. a second cantilever having an inboard end connected to the second adjustable abutment and wherein the fall protection cage is carried at least partially by the second cantilever; and
   e. a second elongated length-adjusting member having an inboard end connected to the second stanchion and an outboard end extending opposite the inboard end and connected to the second adjustable abutment and wherein the second elongated length-adjusting member is configured to selectively vary the distance between the second stanchion and second adjustable abutment.

11. An apparatus that provides selectively deployable worker access with fall protection to at least a portion of the top of a container disposed above the ground, the apparatus comprising:
  a. an elevated platform having a deck suspended above the ground on which the platform is standing;
  b. a gangway having an inboard end pivotally connected to the platform and an outboard end extending opposite the inboard end in the lengthwise direction, the width of the gangway being defined between a first side of the gangway and a second side of the gangway opposing the first side;
  c. at least a pair of first stanchions extending vertically above the gangway, each first stanchion having a vertically lower end pivotally connected to the gangway;
  d. at least a pair of first spacer bars, each first spacer bar having an inboard end and an outboard end extending opposite the inboard end, the inboard end of a first one of the first spacer bars being connected to a first one of the first stanchions, the outboard end of the first one of the first spacer bars extending away from the first one of the stanchions and from the gangway in a direction outboard from the first one of the first stanchions, the inboard end of a second one of the first spacer bars being connected to a second one of the first stanchions, the outboard end of the second one of the first spacer bars extending away from the second one of the first stanchions and from the gangway in a direction outboard from the second one of the first stanchions;
  e. at least a pair of first adjustable abutments extending vertically above the gangway, a first one of the first adjustable abutments having a vertically lower end connected to the outboard end of a first one of the first spacer bars and wherein the first one of the first adjustable abutments is pivotally connected to the first one of the first stanchions via the first one of the first spacer bars, a second one of the first adjustable abutments having a vertically lower end connected to the outboard end of a second one of the first spacer bars and wherein the second one of the first adjustable abutments is pivotally connected to the second one of the first stanchions via the second one of the first spacer bars;
  f. a fall protection cage carried at least partially by the pair of first adjustable abutments; and
  g. a pair of first elongated length-adjusting members, a first one of the first elongated length-adjusting members having an inboard end connected to the first one of the first stanchions and an outboard end extending opposite the inboard end and connected to the first one of the first adjustable abutments and wherein the first one of the first elongated length-adjusting members is configured to selectively vary the distance between the first one of the first stanchions and the first one of the first adjustable abutments, a second one of the first elongated length-adjusting members having an inboard end connected to the second one of the first stanchions and an outboard end extending opposite the inboard end and connected to the second one of the first adjustable abutments and wherein the second one of the first elongated length-adjusting members is configured to selectively vary the distance between the second one of the first stanchions and the second one of the first adjustable abutments.

12. The apparatus of claim 11, wherein each of the first elongated length-adjusting members includes a respective elongated threaded screw.

13. The apparatus of claim 11, wherein the inboard end of the first one of the first elongated length-adjusting members is connected near the vertically higher end of the first one of the first stanchions and the outboard end of the first one of the first elongated length-adjusting members is connected to the first one of the first adjustable abutments vertically above the vertically lower end of the first one of the first adjustable abutments.

14. The apparatus of claim 11, wherein the fall protection cage defines an enclosure that includes at least an upper rail and a lower rail disposed beneath the upper rail and that defines an entrance opening configured to permit ingress and egress of workers via the gangway.

15. The apparatus of claim 14, wherein the enclosure of the fall protection cage includes at least a middle rail disposed between the upper rail and the lower rail.

16. The apparatus of claim 14, further comprising at least a first depending frame carried by at least one of the upper rail and the lower rail and extending vertically beneath the lower rail.

17. The apparatus of claim 16, wherein the enclosure has an inboard side and an outboard side, the first pair of adjustable abutments being disposed closer to the inboard side of the enclosure than to the outboard side of the enclosure.

18. The apparatus of claim 17, further comprising:
  a. a first double-acting linear motor that includes a cylinder and a piston selectively extendable from and contractable into the cylinder, wherein one of the cylinder and the piston being pivotally connected to the enclosure; and
  b. wherein the first depending frame includes a pivoting section having one end pivotally connected to the enclosure of the fall protection cage and having an opposite end pivotally connected to the other one of the cylinder and the piston of the first double-acting linear motor.

19. The apparatus of claim 18, wherein the pivoting section of the first depending frame has one end pivotally connected to the outboard side of the enclosure.

20. The apparatus of claim 11, wherein the pair of first stanchions is disposed to the first side of the gangway, the apparatus further comprising:
  a. at least a pair of second stanchions extending vertically above the gangway, each second stanchion having a vertically lower end pivotally connected to the gangway, the pair of second stanchions being disposed to the second side of the gangway;
  b. at least a pair of second spacer bars, each second spacer bar having an inboard end and an outboard end extending opposite the inboard end, the inboard end of a first one of the second spacer bars being connected to a first one of the second stanchions, the outboard end of the first one of the second spacer bars extending away from the first one of the second stanchions and from the gangway in a direction outboard from the first one of the second stanchions, the inboard end of a second one of the second spacer bars being connected to a second one of the second stanchions, the outboard end of the second one of the second spacer bars extending away from the second one of the second stanchions and from the gangway in a direction outboard from the second one of the second stanchions;
  c. at least a pair of second adjustable abutments extending vertically above the gangway, a first one of the second adjustable abutments having a vertically lower end connected to the outboard end of a first one of the second spacer bars and wherein the first one of the second adjustable abutments is pivotally connected to the first one of the second stanchions via the first one of the second spacer bars, a second one of the second adjustable abutments having a vertically lower end connected to the outboard end of a second one of the second spacer bars and wherein the second one of the second adjustable abutments is pivotally connected to the second one of the second stanchions via the second one of the second spacer bars, wherein the fall protection cage is carried at least partially by the pair of second adjustable abutments; and d. a pair of second elongated length-adjusting members, a first one of the second elongated length-adjusting members having an inboard end connected to the first one of the second stanchions and an outboard end extending opposite the inboard end and connected to the first one of the second adjustable abutments and wherein the first one of the second elongated length-adjusting members is configured to selectively vary the distance between the first one of the second stanchions and the first one of the second adjustable abutments, a second one of the second elongated length-adjusting members having an inboard end connected to the second one of the second stanchions and an outboard end extending opposite the inboard end and connected to the second one of the second adjustable abutments and wherein the second one of the second elongated length-adjusting members is configured to selectively vary the distance between the second one of the second stanchions and the second one of the second adjustable abutments.

21. An apparatus configured to be retrofitted to an elevated platform having a deck suspended above the ground on which the platform is standing, the apparatus to provide selectively deployable worker access with fall protection to at least a portion of the top of a container disposed above the ground, the apparatus comprising:

a. a gangway having an inboard end configured to be pivotally connected to the platform and an outboard end extending opposite the inboard end;

b. at least a first stanchion extending vertically above the gangway and having a vertically lower end pivotally connected to the gangway;

c. at least a first spacer bar having an inboard end and an outboard end extending opposite the inboard end, the inboard end being connected to the first stanchion, the outboard end extending away from the first stanchion and from the gangway in a direction outboard from the first stanchion;

d. at least a first adjustable abutment extending vertically above the gangway and having a vertically lower end connected to the outboard end of the first spacer bar and wherein the first adjustable abutment is pivotally connected to the first stanchion via the first spacer bar;

e. a fall protection cage having an inboard side connected to the first adjustable abutment; and f. a first elongated length-adjusting member having an inboard end connected to the first stanchion and an outboard end extending opposite the inboard end and connected to the first adjustable abutment and wherein the first elongated length-adjusting member is configured to selectively vary the distance between the first stanchion and first adjustable abutment.

* * * * *